Patented Feb. 22, 1938

2,109,182

UNITED STATES PATENT OFFICE 2,109,182

MONOAZO COMPOUNDS AND THEIR PRODUCTION

Heinrich Ohlendorf and Erich Baumann, Dessau in Anhalt, and Karl Holzach, Ludwigshafen-on-the-Rhine, Germany, assignors to General Aniline Works, Inc., New York, N. Y., a corporation of Delaware No Drawing. Application March 31, 1934, Serial No. 718,512. In Germany April 15, 1933

10 Claims. (Cl. 260—96)

This invention relates to the manufacture of new unsulfonated azo dyes which are applicable advantageously for dyeing cellulose esters, particularly acetate artificial silk, by coupling a diazotized amino compound of the general formula

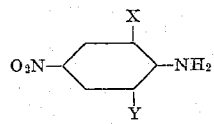

in which X is hydrogen, a nitro group or halogen and Y is hydrogen or halogen, with a benzene derivative capable of being coupled and of the general formula

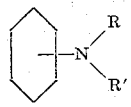

wherein R may be an alkyl or hydroxyethyl group and R' a $\beta,\gamma$-dihydroxypropyl group or a $\gamma$-alkoxy-$\beta$-hydroxypropyl group and in the latter case R may be hydrogen, in this formula the benzene nucleus may contain other substituents, such as alkyl, alkoxy or halogen.

The new dyes have the same good capacity for white discharge, fastness to light and other properties as characterize the dyes described in U. S. Patents No. 1,673,301 and No. 1,805,919, but surpass those dyes in the greater clearness of the dyeings obtained with them as well as by their greater capacity for being suspended and the thoroughness with which they can be exhausted from the bath.

In dyeing they are applied in aqueous suspension with or without the addition of a colloid or solvent.

The following examples illustrate the invention, the parts being by weight:—

*Example 1.*—The diazo solution made in the usual manner from 13.8 parts of 4-nitro-1-aminobenzene is run into a cold solution of 24.6 parts of 3-chloro-1-(hydroxyethyl-$\beta,\gamma$-dihydroxypropyl)-aminobenzene in 18 parts of hydrochloric acid of 23° Bé. and 600 parts of water. The acid is neutralized with sodium acetate up to the end of the coupling. The dye obtained dyes acetate artificial silk a fiery yellowish red of good fastness.

*Example 2.*—A diazo solution made in the usual manner from 17.3 parts of 4-nitro-2-chloro-1-aminobenzene and 23.7 parts of 1-methyl-3-(butyl-$\beta,\gamma$-dihydroxypropyl)-aminobenzene in 20 parts of hydrochloric acid of 23° Bé. and 600 parts of water, and the whole is neutralized with sodium acetate until the coupling is complete. The dye has very good affinity for acetate artificial silk and dyes it a bluish wine-red.

*Example 3.*—A diazo solution is made by stirring, at 25–30° C., 20.7 parts of 2,6-dichloro-1-amino-4-nitrobenzene into nitrosyl sulfuric acid, made by adding 7 parts of sodium nitrite to 130 parts of concentrated sulfuric acid, and the mass is then strongly diluted by pouring it on ice. The filtered sulfuric acid solution of the diazo compound is run into a cold solution of 22.5 parts of hydroxyethyl-$\gamma$-methoxy-$\beta$-hydroxypropyl-aminobenzene in 800 parts of water and 13 parts of hydrochloric acid of 23° Bé. The acid is neutralized with caustic soda solution until the coupling is completed. The dye dyes acetate artificial silk clear yellow brown tints of very good fastness to light.

*Example 4.*—A diazo compound is prepared by stirring 19 parts of 2,4-dinitro-1-aminobenzene into a nitrosyl sulfuric acid, made by introducing 7 parts of sodium nitrite into 120 parts of sulfuric acid, and the mass is then diluted by pouring it upon ice; the whole is now run into a cold solution of 26.7 parts of 1-methyl-4-methoxy-3-(butyl-$\beta,\gamma$-dihydroxypropyl)-aminobenzene. The acid is neutralized with sodium acetate until the coupling is complete. The dye dyes acetate artificial silk violet tints.

The dye obtained in an analogous manner from 22.6 parts of 1-methyl-3-(hydroxyethyl-$\beta,\gamma$-dihydroxypropyl)-aminobenzene dyes acetate artificial silk ruby red.

The dyes have a very good capacity for being suspended and a good affinity in dyeing.

*Example 5.*—29 parts of 6-bromo-2,4-dinitro-1-aminobenzene are stirred at 50–60° C. into nitrosyl sulfuric acid prepared by introducing 7 parts of sodium nitrite into 120 parts of concentrated sulfuric acid, and the mass is then strongly diluted by pouring it upon ice. The sulfuric acid solution of the diazo compound, if necessary after filtration, is run into a cold solution of 25.2 parts of 1-methyl-3-(butyl-$\gamma$-methoxy-$\beta$-hydroxypropyl)-aminobenzene. The dye thus obtained dyes acetate artificial silk very clear reddish blue of very good fastness.

If in this example there is used for the coupling a solution of 26.9 parts of 1-methyl-4-methoxy-3-(hydroxyethyl-$\gamma$-methoxy-$\beta$-hydroxypropyl)-aminobenzene there is obtained a dye which dyes acetate artificial silk a greener blue than that yielded by the preceding dye.

*Example 6.*—The diazo solution made from 29 parts of 6-bromo-2,4-dinitro-1-aminobenzene is coupled with a solution of 22 parts of 3-chloro-1-(γ-methoxy-β-hydroxypropyl)-aminobenzene. The finished dye dyes acetate artificial silk red.

What we claim is:—

1. The process which comprises diazotizing an amine of the general formula

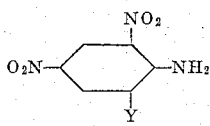

in which Y is a member of the group consisting of hydrogen and halogen, and coupling the diazo compound with an amine of the benzene series corresponding to the general formula

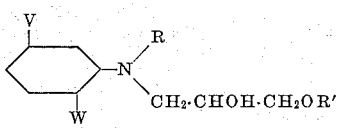

wherein R is a radicle of the group consisting of alkyl and hydroxyethyl, R' is a member of the group consisting of hydrogen and alkyl and in which V and W are members of the group consisting of hydrogen, alkyl, alkoxy and halogen.

2. The process which comprises diazotizing 6-bromo-2,4-dinitraniline and coupling the diazo compound with an amine of the benzene series of the general formula

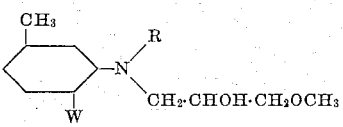

wherein W is a member of the group consisting of hydrogen, alkyl, alkoxy and halogen and R is a member of the group consisting of alkyl and hydroxyethyl.

3. The process which comprises diazotizing 4-nitro-1-aminobenzene and coupling the diazo compound with 3-chloro-1-(hydroxyethyl)-β,γ-dihydroxypropyl)-aminobenzene.

4. The process which comprises diazotizing 6-bromo-2,4-dinitro-1-aminobenzene and coupling the diazo compound with 1-methyl-3-(butyl-γ-methoxy-β-hydroxypropyl)-aminobenzene.

5. The process which comprises diazotizing 6-bromo-2,4-dinitro-1-aminobenzene and coupling the diazo compound with 1-methyl-4-methoxy-3-(hydroxyethyl-γ-methoxy-β-hydroxypropyl)-aminobenzene.

6. The dyes which correspond to the general formula

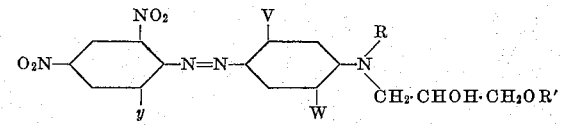

in which y is a member of the group consisting of hydrogen and halogen, R is a radicle of the group consisting of alkyl and hydroxyethyl, R' is a member of the group consisting of hydrogen and alkyl and in which V and W are members of the group consisting of hydrogen, alkyl, alkoxy and halogen, said dyes being insoluble but emulsifiable in water, and dyeing acetate silk clear fast tints from yellow to blue.

7. The dyes which correspond to the general formula

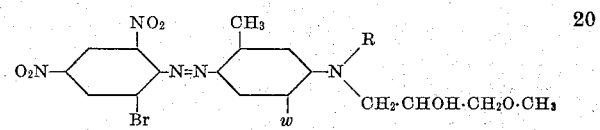

in which w is a member of the group consisting of hydrogen, alkyl, alkoxy and halogen and R is a member of the group consisting of alkyl and hydroxyethyl, said dyes being insoluble but emulsifiable in water and dyeing acetate silk clear reddish blue to blue tints of good fastness.

8. The dye of the formula

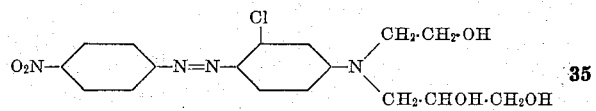

said dye dyeing acetate artificial silk a fiery yellowish red of good properties of fastness.

9. The dye of the formula

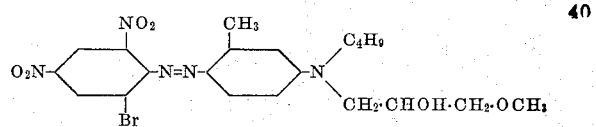

said dye dyeing acetate artificial silk a very clear reddish blue of very good properties of fastness.

10. The dye of the formula

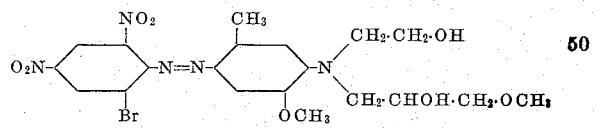

said dye dyeing acetate artificial silk a very clear blue of very good properties of fastness.

HEINRICH OHLENDORF.
ERICH BAUMANN.
KARL HOLZACH.